April 10, 1934.   G. A. BIGGS   1,954,194
HYDRAULIC TURBINE
Filed Dec. 15, 1932   2 Sheets-Sheet 1
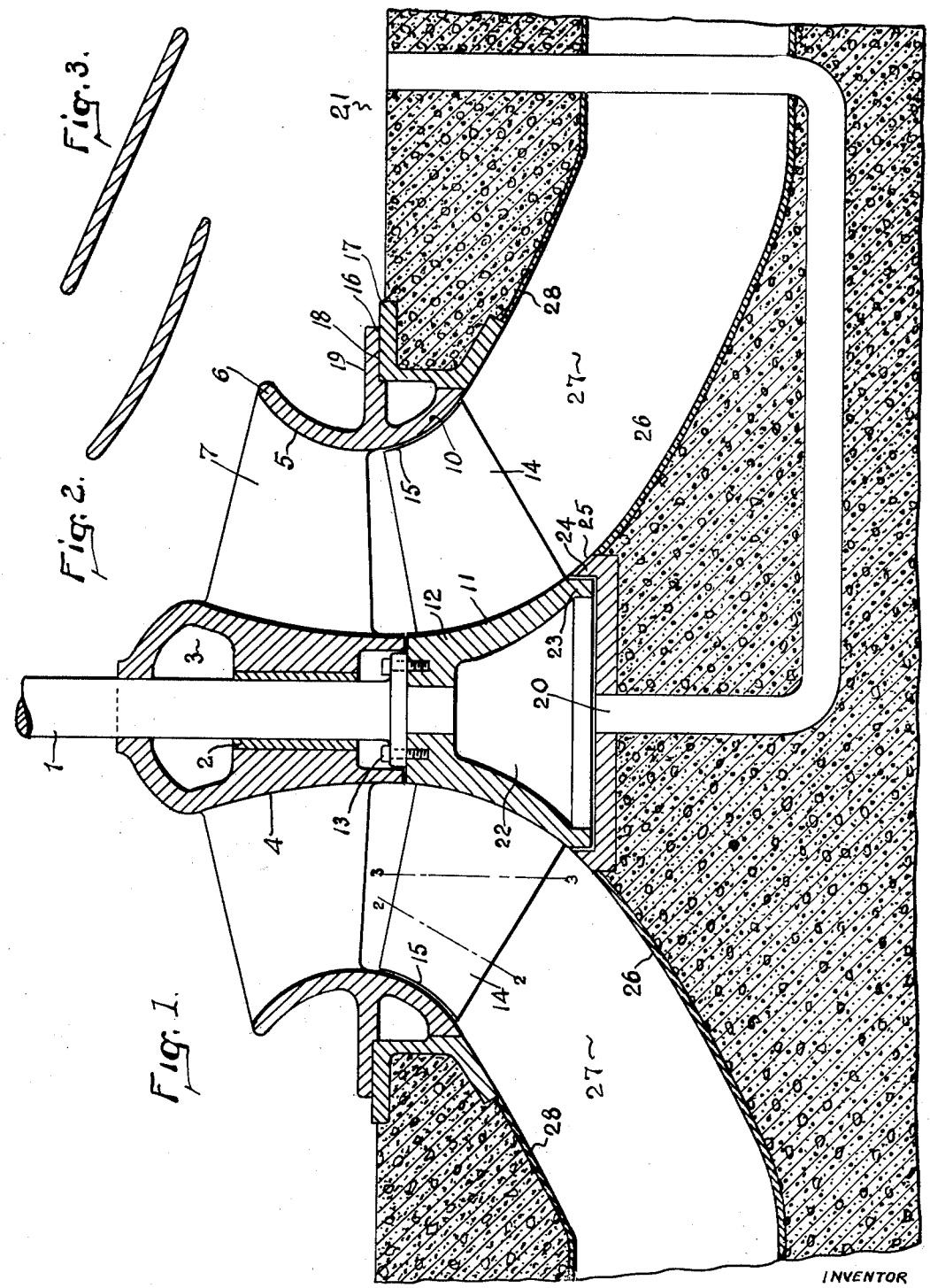
INVENTOR
GEORGE A. BIGGS,
BY
ATTORNEYS April 10, 1934.　　　　G. A. BIGGS　　　　1,954,194
HYDRAULIC TURBINE
Filed Dec. 15, 1932　　2 Sheets-Sheet 2

INVENTOR
GEORGE A. BIGGS,

ATTORNEYS

Patented Apr. 10, 1934

1,954,194

UNITED STATES PATENT OFFICE 1,954,194

HYDRAULIC TURBINE

George A. Biggs, Springfield, Ohio, assignor to The James Leffel & Company, Springfield, Ohio, a corporation of Ohio Application December 15, 1932, Serial No. 647,356

16 Claims. (Cl. 253—117)

My invention relates to hydraulic turbines.

It is the object of my invention to provide a hydraulic turbine in which the overall height of the draft tube can be reduced to the minimum.

It is my object to provide an axial flow hydraulic turbine having a high speed propeller runner in which the tendency of a high speed propeller runner to impart an undesirable thrust on the generator can be eliminated and thereby greatly reduce the cost of the generator.

It is a further object to combine a high speed turbine runner with the parallel wall draft tubes.

It is my object to provide a hydraulic turbine runner having blades that are straight in section when the section is taken on a cylinder, the axis of which is coincident with the axis of the runner; and it is my object to provide a runner in which the blades are concave on top and convex on the bottom on a conical section, the axis and apex of which lie in the runner axis.

It is my object to provide a high speed runner with diagonally disposed blades and parallel arranged superimposed guide vanes in an axial flow runner.

It is a further object to provide a combined runner bearing, a hub for the guide vanes and a guide vane ring which also constitutes a part of the draft tube, the bore of the foundation ring upon which the guide vane ring rests being greater than the runner so that the guide vane ring can be readily removed and the runner removed without disturbing the foundation ring.

Referring to the drawings:

Figure 1 is a vertical section through the draft tube, runner and guide vane mechanism;

Figure 2 is a section on the line 2—2 of Figure 1, the section being taken on a line on the surface of a cone, the axis and apex of which lie in the runner axis;

Figure 3 is a section on the line 3—3 of Figure 1 and is a section taken on the surface of a cylinder, the axis of which coincides with the axis of the runner;

Figure 4:
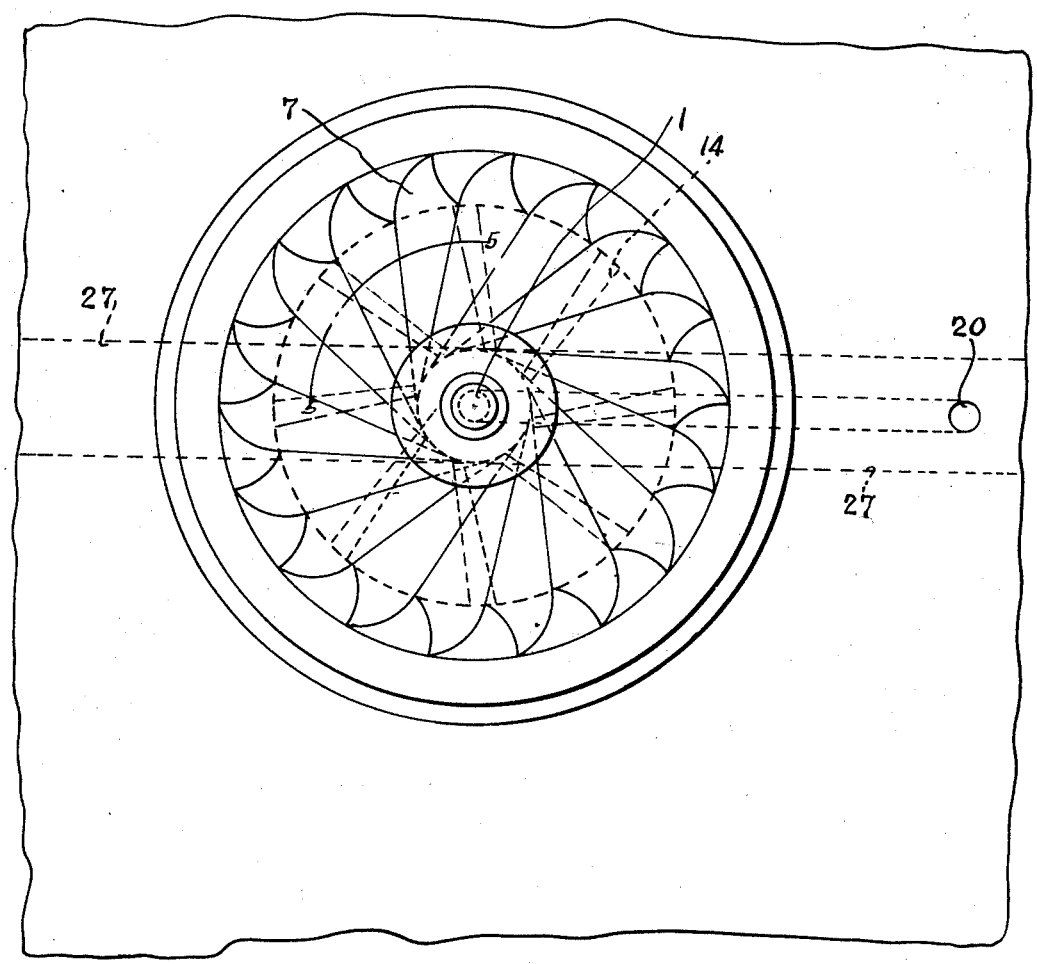
Figure 4 is a top plan view.

Referring to the drawings in detail, 1 is a runner shaft suitably connected to a generator, which is not shown.

Figure 5:
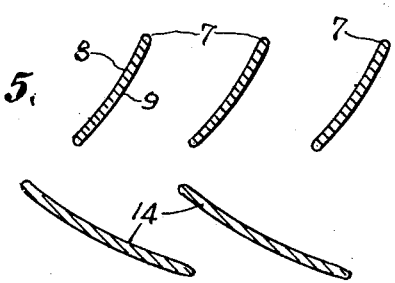
Figure 5 is a section on the line 5—5 of Figure 4.

Surrounding this shaft and acting as a bearing 2 therefor is a guide vane hub 3 having an arcuate exterior wall 4 in substantial parallelism with the upwardly and outwardly curved upper wall 5 of a guide vane ring 6 forming the throat of a runner tube. Guide vanes 7 connect the hub 3 and the ring 6. It is preferred that these vanes be arranged at an angle as indicated in Figure 5 and have an arcuate upper face as at 8 and a convex lower face as at 9.

The guide vane ring 5 extends below the vane 7 in an arcuate path forming a downwardly and outwardly curved lower wall 10 which is an extension of the draft tube and is in parallelism with the concave surface 11 of the runner hub 12 that is connected by the bolts 13 to the runner shaft 1.

The hub 12 carries the runner blades or buckets 14. The outer ends of these runner blades or buckets at 15 have their ends formed in parallelism with the arcuate surface of the wall 10. An outwardly extending flange 19 of the ring 6 rests as at 16 on the top 18 of the foundation ring 17, while the outer periphery of the curved wall 10 engages the interior of the ring 17. It will be noted that the guide vane ring is so arranged that it may be withdrawn upwardly without disturbing the foundation ring and it will be further observed that the runner is smaller in diameter than the interior diameter of the foundation ring so that the runner can be removed without disturbing the foundation ring.

The runner buckets themselves are substantially straight and the longitudinal axes are straight. As will be noted in the section 2—2 the curvature of the bucket is slight and in the section 3—3 the bucket is straight.

It is also preferred by this high speed type of runner to provide the axis diagonally disposed above the horizontal plane.

I thus provide in combination guide vanes and runner buckets of a high speed runner in substantial parallelism and both stationary in the sense that they are not rotatable about their own axis. In a high speed hydraulic turbine of the character herein described, very considerable excess cost of a generator is necessary in order to take the thrust from a high speed propeller wheel of this character. In order to obviate this difficulty, I provide a pipe 20 which communicates with the head waters at 21 and conveys the head waters through the pipe 20 to the thrust chamber 22 in the base of the hub 12. It will be noted that this hub flares downwardly and outwardly as distinguished from the ordinary hub that tapers downwardly and inwardly.

This hub has a flange 23 nested within a base having a flange or ring 24, the outer edge of which is tapered at 25 in line with the surface 11 of the hub and in line with the draft tube surface 26. There is a clearance between the bottom of the hub 12 and the ring 24 so as to permit of the leakage of the water from the thrust chamber into the discharge portion of the draft tube as at 27.

Another feature of my invention is to reduce the overall height of the concrete structure and of the draft tube thereby facilitating the ready exit of the water and at the same time greatly economizing in the cost of the installation.

The draft tube walls 26 and 28 are conic surfaces parallel with each other. This permits of the exit of the water from the high speed turbine rapidly and effectively without interfering with the operation of the turbine and, at the same time, permits of an exit from this axial flow machine with the minimum of turbulence in a construction having minimum height.

It will be understood that I desire to comprehend within my invention such modifications as may be necessary to adapt it to varying conditions and uses.

Having thus fully described my invention, what I claim as new and desire to secure by Letters Patent, is:

1. In combination, a high speed propeller runner shaft having blades thereon, and means to reduce the thrust of the blades on the shaft, said means comprising means for conveying hydraulic pressure from the head waters over the turbine to a point beneath the turbine runner to absorb the downward thrust thereof within the hub thereof, and means of discharging the leakage therefrom into the draft tube below the runner.

2. In combination, a hydraulic turbine runner having a shaft, a hub having downwardly and outwardly flaring walls forming a hollow open bottom chamber, blades on the exterior of said hub, and a spaced stationary closure member enclosing the open end of said hub, and means for conveying hydraulic pressure to the interior of said hub to absorb the downward thrust of the runner.

3. In a hydraulic turbine runner, the combination of a runner shaft, an open mouthed bell-shaped hub and a plurality of substantially straight vanes mounted thereon to form buckets, a base having a flange surrounding the mouth of the hub, and means to supply pressure to the base beneath the hub.

4. In a hydraulic turbine runner, the combination of a runner shaft, an open mouthed bell-shaped hub and a plurality of substantially straight vanes mounted thereon to form buckets, said vanes being straight on a section taken on the surface of a cylinder whose axis coincides with the runner axis, a base having a flange surrounding the mouth of the hub, and means to supply pressure to the base beneath the hub.

5. In a hydraulic turbine runner, the combination of a runner shaft, an open mouthed bell-shaped hub and a plurality of substantially straight vanes mounted thereon to form buckets, said vanes being straight on a section taken on the surface of a cylinder whose axis coincides with the runner axis, said buckets being concave on top and convex on the bottom when taken on a section described on a surface of a cone, the apex and axis of which are coincident with the runner axis, a base having a flange surrounding the mouth of the hub, and means to supply pressure to the base beneath the hub.

6. In combination, a turbine runner comprising a runner shaft, a depending, open-mouthed, bell-shaped hub and a plurality of substantially straight buckets diverging therefrom having their longitudinal axes diagonally disposed above a horizontal plane a base having a flange surrounding the mouth of the hub, and means to supply pressure to the base beneath the hub.

7. In combination, a turbine runner comprising a runner shaft, a depending, open-mouthed, bell-shaped hub, a plurality of substantially straight buckets diverging therefrom having their longitudinal axes diagonally disposed above a horizontal plane, and means of introducing hydraulic pressure in the interior of said hub for forcing the runner upwardly against its downward thrust.

8. In combination, a turbine runner comprising a runner shaft, a depending, open-mouthed, bell-shaped hub, a plurality of substantially straight buckets diverging therefrom having their longitudinal axes diagonally disposed above a horizontal plane, means of introducing hydraulic pressure in the interior of said hub for forcing the runner upwardly against its downward thrust, and a draft tube for receiving said runner, the walls of which are arcuate in extension of the arcuate surface of the runner hub.

9. In combination, a turbine runner comprising a runner shaft, a depending, open-mouthed, bell-shaped hub, a plurality of substantially straight buckets diverging therefrom having their longitudinal axes diagonally disposed above a horizontal plane, means of introducing hydraulic pressure in the interior of said hub for forcing the runner upwardly against its downward thrust, and a draft tube for receiving said runner, the walls of which are arcuate in extension of the arcuate surface of the runner hub and in parallelism with one another.

10. In combination, in a hydraulic turbine installation, substantially parallel chambers for head and tail waters, means forming arcuate passageways establishing communication between said chambers and comprising a draft tube, the walls of which are conic surfaces parallel with each other, a turbine runner mounted in said draft tube comprising a shaft, a hub having exterior downwardly and outwardly flaring surfaces in extension of the lower draft tube wall, a plurality of buckets mounted on said hub, the ends of which are arcuate in parallelism with the outer and upper draft tube wall, and a guide vane ring extending from above said runner into said draft tube having an arcuate face in extension of the upper draft tube and extending from the draft tube to a point within the head water chamber, the interior of said guide vane ring being semicircular in section, and a plurality of guide vanes horizontally disposed on said ring above said runner blades.

11. In combination, in a hydraulic turbine installation, substantially parallel chambers for head and tail waters, means forming arcuate passageways establishing communication between said chambers and comprising a draft tube, the walls of which are conic surfaces parallel with each other, a turbine runner mounted in said draft tube comprising a shaft, a hub having exterior downwardly and outwardly flaring surfaces in extension of the lower draft tube wall, a plurality of buckets mounted on said hub, the ends of which are arcuate in parallelism with the outer and upper draft tube wall, and a guide vane ring extending from above said runner into said draft tube having an arcuate face in extension of the upper draft tube and extending from the draft tube to a point within the head water chamber, the interior of said guide vane ring being semicircular in section, and a plurality of guide vanes horizontally disposed on said ring above said runner blades within the hub water chamber.

12. A new article of manufacture for use as a means of guiding water to a hydraulic turbine runner comprising a guide vane ring having an inner arcuate surface, the upper part of said surface being curved upwardly and outwardly and its lower part being curved downwardly and outwardly, horizontally disposed guide vanes above the center, a hub for supporting the inner ends of said guide vanes and means on the exterior of said guide vane ring for supporting it and the guide vanes upon a foundation ring.

13. In combination, a draft tube having a foundation ring in the mouth thereof, a guide vane ring having an upwardly and outwardly curved upper wall, a downwardly and outwardly curved lower wall and an outwardly extending flange, said flange being adapted to rest upon the foundation ring with the lower wall in the foundation ring, and a hub supported by the guide vane ring.

14. In combination, a draft tube having a foundation ring in the mouth thereof, a guide vane ring having an upwardly and outwardly curved upper wall, a downwardly and outwardly curved lower wall and an outwardly extending flange, said flange being adapted to rest on the foundation ring with the lower wall in the foundation ring, hub in the guide vane ring, and vanes integral with the hub and the guide vane ring for supporting the hub.

15. In combination, a draft tube having a foundation ring in the mouth thereof, a guide vane ring having an upwardly and outwardly curved upper wall, a downwardly and outwardly curved lower wall and an outwardly extending flange, said flange being adapted to rest on the foundation ring with the lower wall in the foundation ring, a hub in the guide vane ring, vanes integral with the hub and the guide vane ring for supporting the hub, and a shaft having runner buckets thereon supported by the hub.

16. In combination, a draft tube having a foundation ring in the mouth thereof a guide vane ring having an upwardly and outwardly curved upper wall, a downwardly and outwardly curved lower wall and an outwardly extending flange, said flange being adapted to rest on the foundation ring with the lower wall in the foundation ring, a hub in the guide vane ring, vanes integral with the hub and the guide vane ring for supporting the hub, a shaft supported by the hub, a runner hub on the shaft, and buckets on the runner hub between the runner hub and the curved lower wall.

GEORGE A. BIGGS.